US009990077B2

(12) United States Patent
Lu et al.

(10) Patent No.: US 9,990,077 B2
(45) Date of Patent: Jun. 5, 2018

(54) ARRAY SUBSTRATE, TOUCH DISPLAY PANEL, AND DETECTION METHOD

(71) Applicants: Shanghai Tianma Micro-Electronics Co., Ltd., Shanghai (CN); Tianma Micro-Electronics Co., Ltd., Shenzhen (CN)

(72) Inventors: Feng Lu, Shanghai (CN); Qijun Yao, Shanghai (CN)

(73) Assignees: SHANGHAI TIANMA MICRO-ELECTRONICS CO., LTD., Shanghai, P.R. (CN); TIANMA MICRO-ELECTRONICS CO., LTD., Shenzhen, P.R. (CN)

( * ) Notice: Subject to any disclaimer, the term of this patent is extended or adjusted under 35 U.S.C. 154(b) by 279 days.

(21) Appl. No.: 14/964,310

(22) Filed: Dec. 9, 2015

(65) Prior Publication Data

US 2016/0291779 A1     Oct. 6, 2016

(30) Foreign Application Priority Data

Apr. 1, 2015  (CN) .......................... 2015 1 0153210

(51) Int. Cl.
  *G06F 3/041*   (2006.01)
  *G06F 3/044*   (2006.01)
(52) U.S. Cl.
  CPC ............ *G06F 3/0416* (2013.01); *G06F 3/044* (2013.01)
(58) Field of Classification Search
  CPC ....... G06F 3/0416; G06F 3/0412; G06F 3/044
  See application file for complete search history.

(56) References Cited

U.S. PATENT DOCUMENTS

| 2012/0113038 | A1* | 5/2012 | Chen ..................... | G06F 3/0412 |
| | | | | 345/173 |
| 2015/0205428 | A1* | 7/2015 | Wang ..................... | G06F 3/044 |
| | | | | 345/174 |
| 2015/0346885 | A1* | 12/2015 | Ding ..................... | G06F 3/0412 |
| | | | | 345/173 |
| 2016/0202790 | A1* | 7/2016 | Yang ..................... | G06F 3/0412 |
| | | | | 345/174 |
| 2016/0216811 | A1* | 7/2016 | Yang ..................... | G06F 3/0412 |
| 2016/0291777 | A1* | 10/2016 | Xi .......................... | G06F 3/044 |

FOREIGN PATENT DOCUMENTS

CN        102375258 B    10/2014

* cited by examiner

*Primary Examiner* — Patrick Edouard
*Assistant Examiner* — Maheen Javed
(74) *Attorney, Agent, or Firm* — Alston & Bird LLP

(57) ABSTRACT

There are provided according to the disclosure an array substrate, a touch display panel, and a detection method. The array substrate includes: a common electrode layer divided into multiple touch electrodes; multiple control circuits respectively connected to the plurality of touch electrodes, multiple first leads, each first lead is electronically connected to the first control terminals and the first input terminals of the control circuits corresponding to the touch electrodes in the same row with the first lead; and multiple second leads, each second lead is electronically connected to the second control terminals and the second input terminals of the control circuits corresponding to the touch electrodes in the same column with the second lead.

15 Claims, 7 Drawing Sheets

ARRAY SUBSTRATE, TOUCH DISPLAY PANEL, AND DETECTION METHOD

CROSS REFERENCE TO RELATED APPLICATIONS

The present application claims priority to Chinese Patent Application No. 201510153210.9, titled "ARRAY SUBSTRATE, TOUCH DISPLAY PANEL, TOUCH DISPLAY DEVICE AND DETECTION METHOD", filed on Apr. 1, 2015 with the State Intellectual Property Office of People's Republic of China, which is incorporated herein by reference in its entirety.

FIELD OF THE INVENTION

The disclosure generally relates to the field of touch technique, and in particular to an array substrate, a touch display panel, and a detection method.

BACKGROUND OF THE INVENTION

In an existing in-cell touch panel, a common electrode layer is divided into multiple electrode blocks separated from each other. Each electrode block is electronically connected to a drive circuit IC through a touch lead, and the electrode blocks serve as common electrodes in a display period and serve as touch electrodes in a touch period.

However, a large number of touch leads connected to the electrodes have to be disposed in the touch panel, thereby increasing complexity in design and manufacture of the in-cell touch panel and decreasing defect-free rate and stability of the in-cell touch panel.

BRIEF SUMMARY OF THE INVENTION

In view of this, there are provided according to the disclosure an array substrate, a touch display panel, and a detection method, in order to solve the problems in the conventional art of high complexity in design and manufacture of the touch panel, low defect-free rate and low stability of the in-cell touch panel due to the large number of the leads.

To achieve the above object, it is provided following technical solutions according to the disclosure.

An array substrate includes:

a common electrode layer divided into multiple touch electrodes disposed as an array;

multiple control circuits respectively connected to the plurality of touch electrodes; where each of the control circuits includes:

a first input terminal via which a touch drive signal or a touch detection signal is input;

a second input terminal via which the touch drive signal or the touch detection signal is input;

a first control terminal via which the control circuit is controlled to be input with the signal input via the second input terminal; and a second control terminal via which the control circuit is controlled to be input with the signal input via the first input terminal;

multiple first leads, each first lead is electronically connected to the first control terminals and the first input terminals of the control circuits corresponding to the touch electrodes in the same row with the first lead; and multiple second leads, each second lead is electronically connected to the second control terminals and the second input terminals of the control circuits corresponding to the touch electrodes in the same column with the second lead.

It is also provided according to an embodiment of the disclosure a touch display panel including the above array substrate.

It is also provided according to an embodiment of the disclosure a detection method applied to the above array substrate. The detection method includes:

performing touch detection on the touch electrodes row by row or column by column;

determining whether a single reference touch point occurs or multiple reference touch points occur; and outputting position information of the reference touch point in the case that one reference touch point occurs; or performing touch detection on the touch electrode corresponding to each of the multiple reference touch points and neighbor touch electrodes adjacent to the touch electrode separately to determine touch points and outputting the position information of the touch points, in the case that the multiple reference touch points occur.

Compared with the conventional art, the advantageous effects of the technical solutions according to the disclosure are as follows.

According to the array substrate, the touch display panel, and the detection method provided in the disclosure, the common electrode layer is divided into multiple touch electrodes disposed as an array, and each touch electrode is connected to the control circuit corresponding to the touch electrode. The control circuits corresponding to the touch electrodes in the same row with the first lead are connected to the first lead, the control circuits corresponding to the touch electrodes in the same column with the second lead are connected to the second lead. That is, under the control performed by the control circuit, the touch drive and the touch detection may be performed on the touch electrodes in the same row or column being electronically connected to only one lead, thereby greatly decreasing the number of the touch leads, and the problems of high complexity in design and manufacture of the touch display device, low defect-free rate and low stability of the touch display device are solved. And ghost points are eliminated, hence the touch scanning efficiency is increased by the control circuit performing the touch detecting on the touch electrodes.

BRIEF DESCRIPTION OF THE DRAWINGS

Technical solutions of the embodiments of the present applicant and/or the prior art will be illustrated more clearly with the following brief description of the drawings. Apparently, the drawings referred in the following description constitute only a few of embodiments of the disclosure. Those skilled in the art may obtain some other drawings from these drawings without any creative work.

DETAILED DESCRIPTION OF THE INVENTION

The technical solution according to the embodiments of the disclosure is described clearly and completely as follows in conjunction with the accompanying drawings. It is obvious that the described embodiments are only a part of the embodiments according to the disclosure. Any of other embodiments obtained by those skilled in the art based on the embodiments in the disclosure without any creative work falls in the scope of the disclosure.

Figure 1:
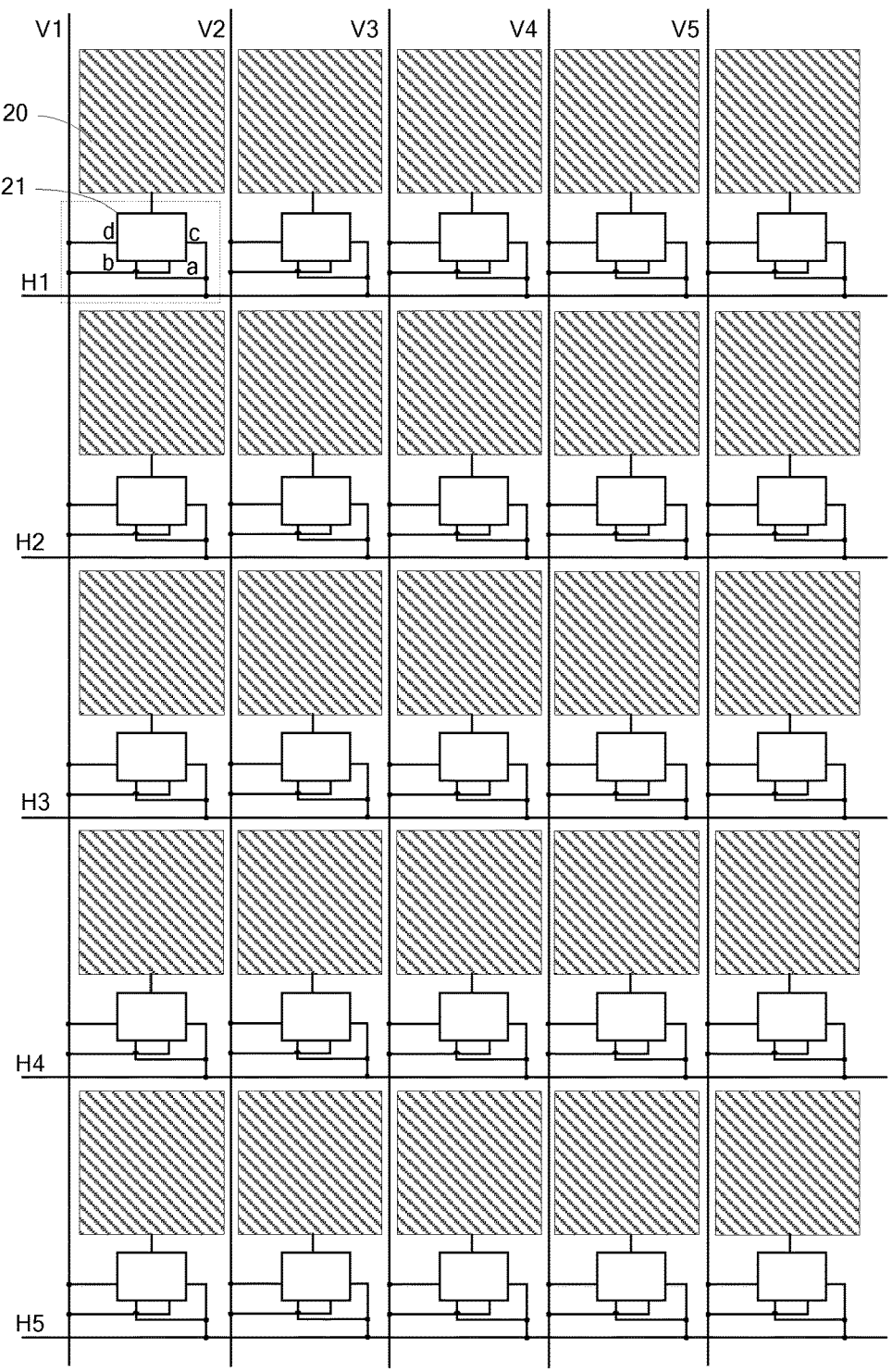
FIG. 1 is a schematic structural diagram of an array substrate according to an embodiment of the disclosure.

It is provided an array substrate according to an embodiment of the disclosure. As shown in FIG. 1, the array substrate includes multiple touch electrodes 20 and multiple control circuits 21 disposed as an array, multiple first leads H and multiple second leads V. The multiple touch electrodes 20 are formed by dividing a common electrode layer. The control circuits 21 respectively connected to the touch electrodes 20. Each control circuit 21 includes: a first input terminal a via which a touch drive signal or a touch detection signal is input; a second input terminal b via which the touch drive signal or the touch detection signal is input; a first control terminal c via which the control circuit is controlled to be input with the signal input via the second input terminal b; and a second control terminal d via which the control circuit is controlled to be input with the signal input via the first input terminal a. Each first lead H is electronically connected to the first control terminals c and the first input terminals a of the control circuits 21 corresponding to the touch electrodes 20 in the same row with the first lead H. Each second lead V is electronically connected to the second control terminals d and the second input terminals b of the control circuits 21 corresponding to the touch electrodes 20 in the same column with the second lead V.

Figure 2:
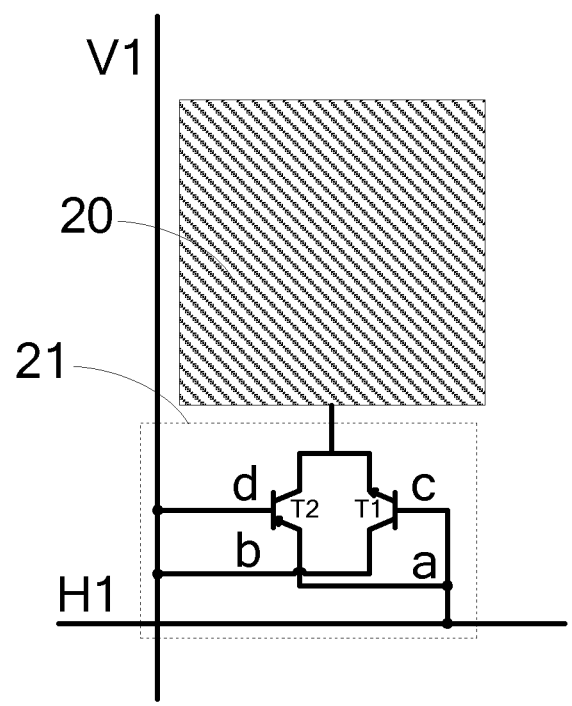
FIG. 2 is a schematic diagram of a control circuit according to an embodiment of the disclosure.

As shown in FIG. 2, the control circuit 21 according to the embodiment includes a first transistor T1 and a second transistor T2. A second electrode of the first transistor T1 and a second electrode of the second transistor T2 are electronically connected to the touch electrode 20 corresponding to the control circuit. A gate electrode of the first transistor T1 is the first control terminal c of the control circuit 21, a first electrode of the second transistor T2 is the first input terminal a of the control circuit 21, a gate electrode of the second transistor T2 is the second control terminal d of the control circuit 21, and a first electrode of the first transistor T1 is the second input terminal b of the control circuit 21.

Figure 3:
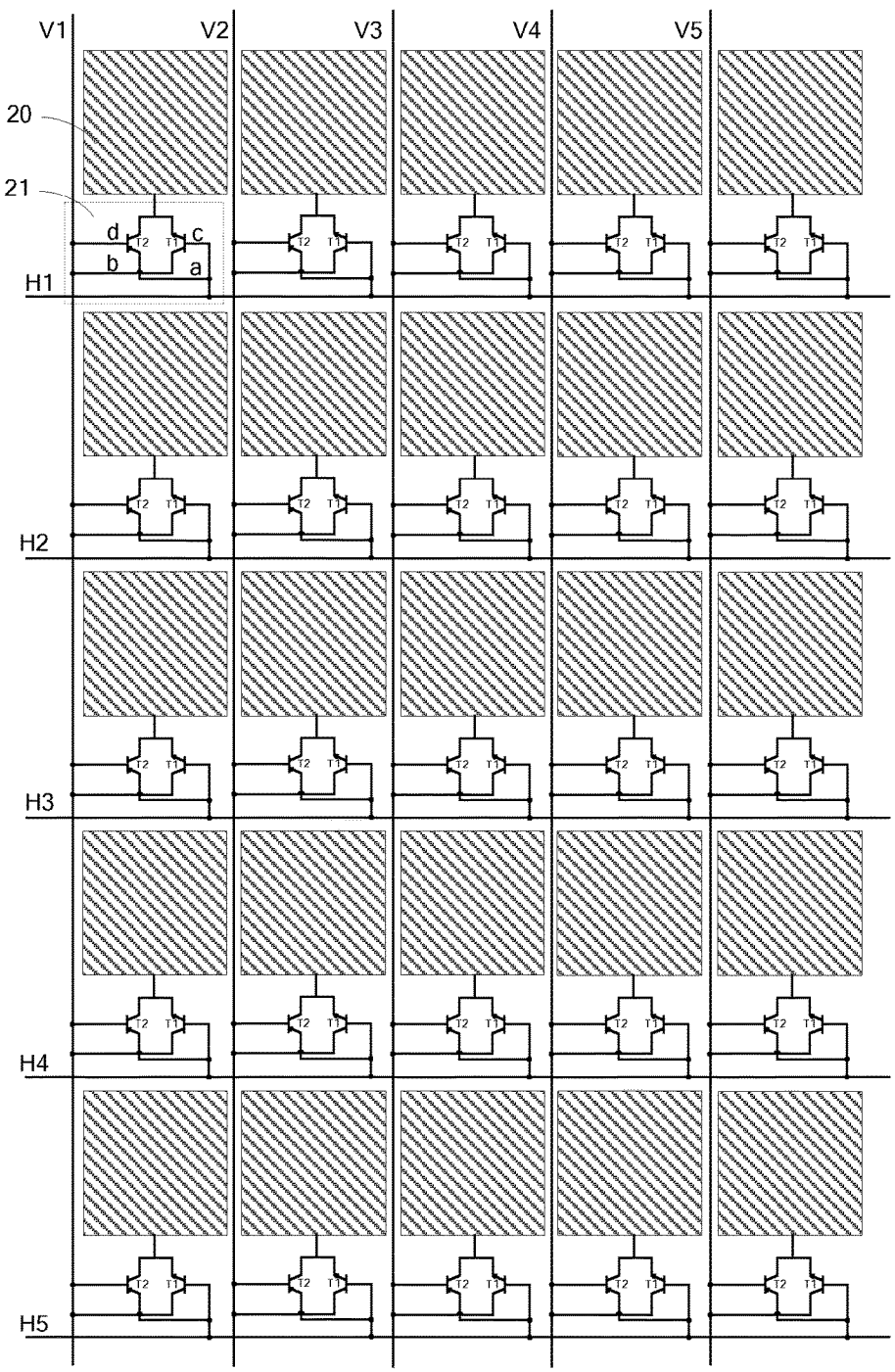
FIG. 3 is a schematic structural diagram of an array substrate including the control circuit shown in FIG. 2 according to an embodiment of the disclosure.

In this embodiment, the control process performed by the control circuit 21 is described with the first transistor T1 and the second transistor T2 being NMOS transistors. The NMOS transistor is on when a high level is input, and is off when a low level is input. As shown in FIG. 3, the control circuits 21 including the first transistors T1 and the second transistors T2 are disposed respectively corresponding to the touch electrodes 20.

The touch drive and the touch detection are performed on the touch electrode 20 through the control circuit 21 as follows. In a touch drive period i.e. a precharge period, a first control signal is input to the first control terminal c and the touch drive signal is input to the first input terminal a through the first lead H1, and a second control signal is input to the second control terminal d through the second lead V1. The voltage of the first control signal is lower than the voltage of the second control signal, that is, the first control signal is a low level signal and the second control signal is a high level signal. In this case, the first transistor T1 is off and the second transistor T2 is on. The touch drive signal is transmitted to the touch electrode 20 through the second transistor T2 to perform the touch drive on the touch electrode 20. In a touch detection period, the first control signal is input to the first control terminal c and the touch detection signal is input to the first input terminal a through the first lead H1, and the second control signal is input to the second control terminal d through the second lead V1. In this case, the first transistor T1 is off and the second transistor T2 is on. The touch detection signal is transmitted to the touch electrode 20 through the second transistor T2 to perform the touch detection on the touch electrode 20 and to determine whether a user performs a touch on the position where the touch electrode 20 locates.

In this embodiment, the control circuit 21 may be input with the touch drive signal via the first input terminal a and input with the touch detection signal via the first input terminal a. Alternatively, the control circuit 21 may be input with the touch drive signal via the first input terminal a and input with the touch detection signal via the second input terminal b. Alternatively, the control circuit 21 may be input with the touch drive signal via the second input terminal b and input with the touch detection signal via the first input terminal a. Alternatively, the control circuit 21 may be input with the touch drive signal via the second input terminal b and input with the touch detection signal via the second input terminal b, which is not limited herein.

When the first control signal is input to the first control terminal c through the first lead H1 and the second control signal is input to the second control terminal d through the second lead V1, both the first transistor T1 and the second transistor T2 are off, the touch drive and the touch detection are not performed on the touch electrode 20 corresponding to the first lead H1 and the second lead V1, the touch electrode 20 maintains the current state. When the second control signal is input to the first control terminal c through the first lead H1 and the first control signal is input to the second control terminal d through the second lead V1, both the first transistor T1 and the second transistor T2 are on, the touch electrode 20 servers as common electrodes, and the touch electrode 20 provides a common voltage for the display device.

Figure 4:
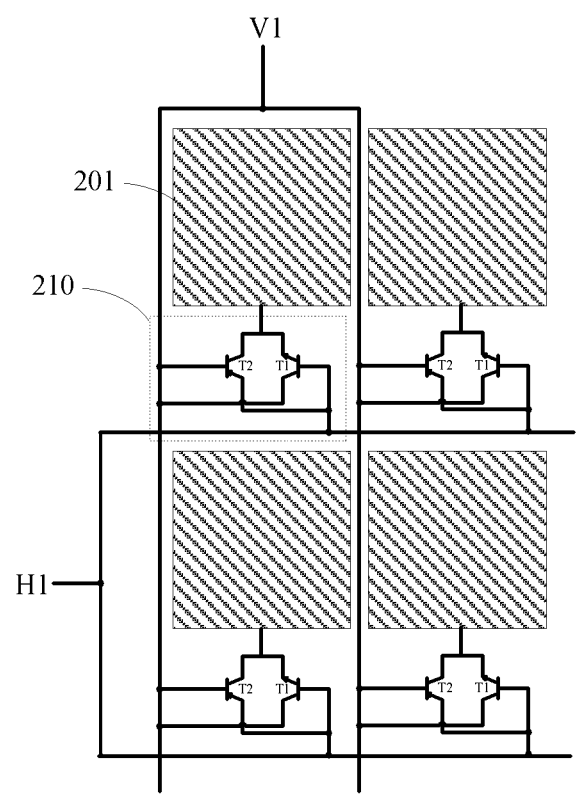
FIG. 4 is a schematic structural diagram of an array substrate including multiple sub-control circuits according to an embodiment of the disclosure.

In other embodiments of the present disclosure, as shown in FIG. 4, in the case that the touch electrode 20 includes multiple touch sub-electrodes 201, sub-control circuits 210 corresponding to the touch sub-electrodes 201 are connected in parallel. That is, the first leads H1 of all the touch sub-electrodes 201 are electronically connected, and the second leads V1 of all the touch sub-electrodes 201 are electronically connected. The sub-control circuits 210 connected in parallel may be locate in different pixel units, and the resistance when performing the touch detection on the same touch electrode 20 is decreased, thereby improving the performance of self-capacitive touch detection. And the first lead H, the second lead V and the control circuit 21 in the embodiment may locate in only a part of the pixel units. Preferably, the first lead H, the second lead V and the control circuit 21 in the embodiment may not locate in a green pixel unit but locate in other pixel units for example a blue pixel unit, a red pixel unit and a white pixel unit.

Figure 5:
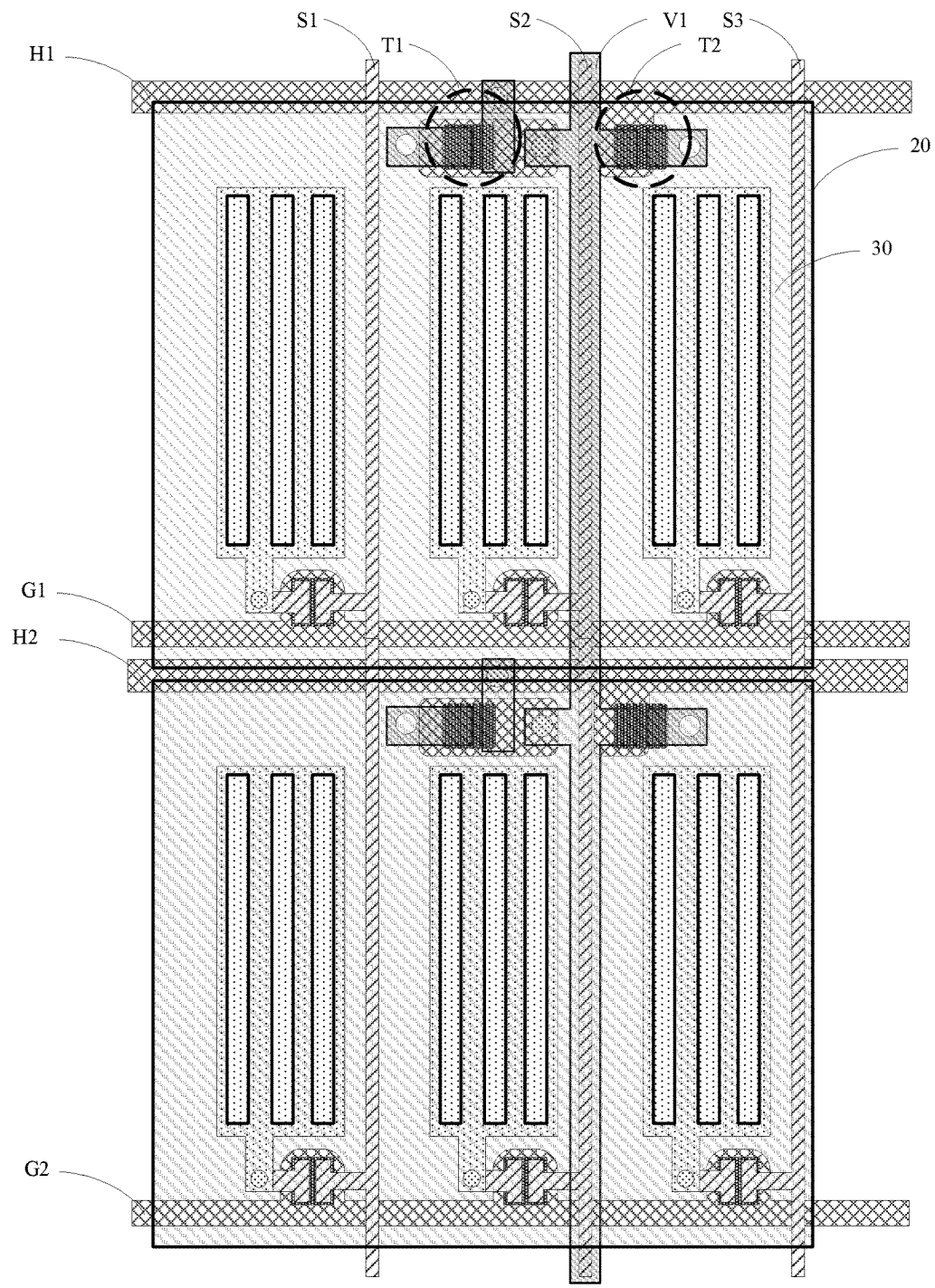
FIG. 5 is a schematic structural diagram of pixel units, touch electrodes and control circuits according to an embodiment of the disclosure.
Figure 6:
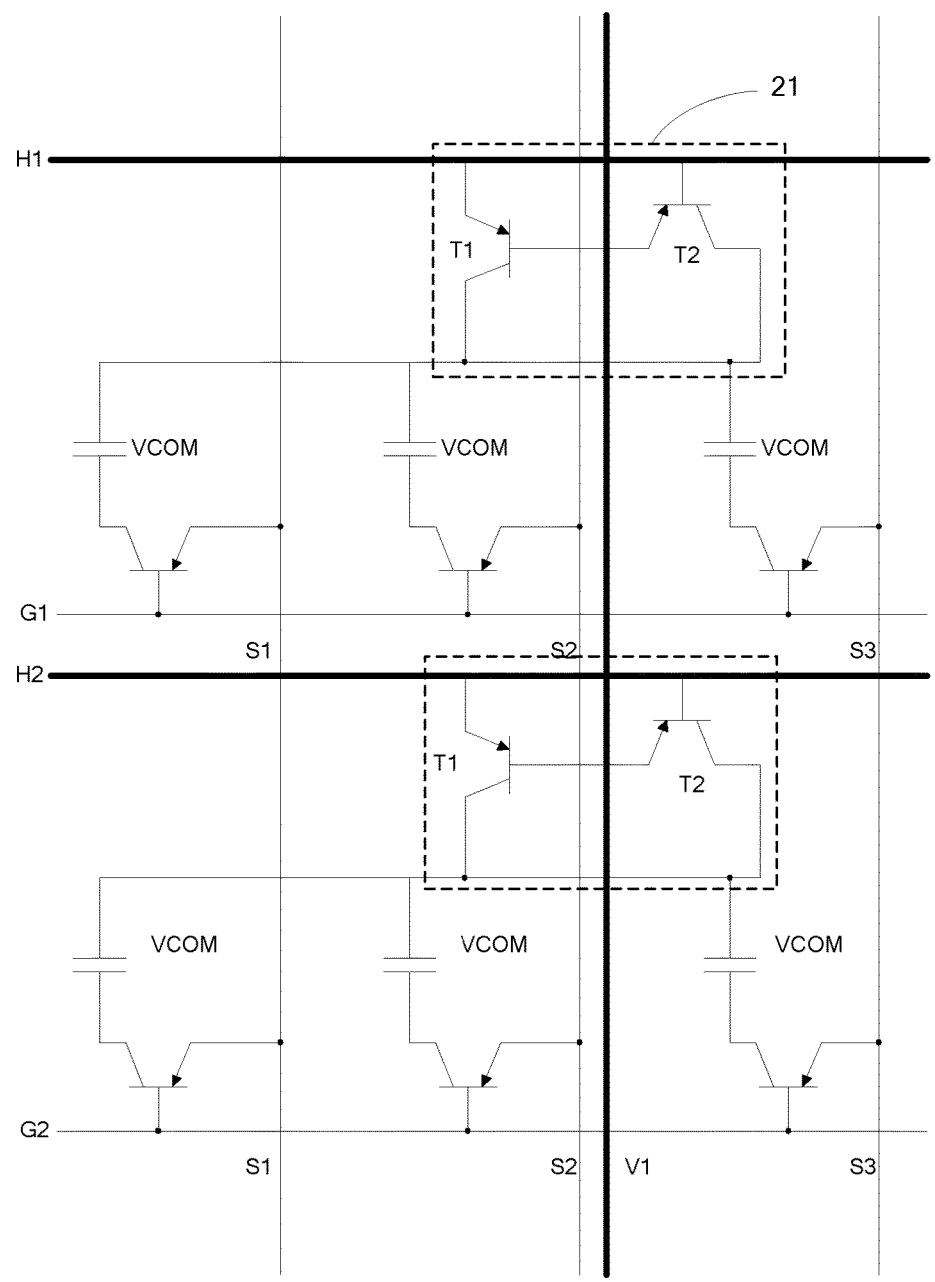
FIG. 6 is a schematic diagram of an equivalent circuit of pixel units, touch electrodes and control circuits according to an embodiment of the disclosure.

In addition, in this embodiment, as shown in FIG. 5, the array substrate further includes multiple gate lines G, multiple data lines S and multiple pixel units 30 surrounded by the gate lines and the data lines. Each touch electrode 20 covers multiple pixel units 30. In FIG. 5, a single touch electrode 20 covers three pixel units 30. As shown in FIG. 5, an extending direction of the first lead H1 is parallel to the extending direction of the gate line G1, the first lead H1 may be in the same layer with the gate line G1 and may also not be in the same layer with the gate line G1. In the case that the first lead H1 is not in the same layer with the gate line G1, the first lead H1 may overlap with the gate line Gl. The extending direction of the second lead V1 is parallel to the extending direction of the data line S2, the second lead V1 may be in the same layer with the data line S2 and may be also not in the same layer with the data line S2. In the case that the second lead V1 is not in the same layer with the data line S2, the second lead V1 may overlap with the data line S2. The first transistor T1 and the second transistor T2 are electronically connected to the first lead H1 or the second lead V1 via holes. FIG. 6 is a schematic diagram of an equivalent circuit of pixel units, touch electrodes and control circuits.

It should be noted that the first electrode of the thin film transistor in the embodiment is a source electrode, and the second electrode of the thin film transistor is a drain electrode, however the disclosure is not limited thereto. The first transistor and the second transistor in the embodiment may be NMOS transistors or PMOS transistors. The voltage of the first control signal is lower than the voltage of the second control signal, in the case that the first transistor T1 and the second transistor T2 are NMOS transistors; or the voltage of the first control signal is higher than the voltage of the second control signal, in the case that the first transistor T1 and the second transistor T2 are PMOS transistors. In addition, in other embodiments of the disclosure, the structure of the control circuit may be different from the structure of the control circuit in the embodiment as long as the control function may be achieved.

According to the array substrate provided by the embodiment, the common electrode layer is divided into multiple touch electrodes disposed as an array, and each touch electrode is connected to the control circuit corresponding to the touch electrode. The control circuits corresponding to the touch electrodes in the same row with the first lead are connected to the first lead, the control circuits corresponding to the touch electrodes in the same column with the second lead are connected to the second lead. That is, under the control performed by the control circuit, the touch drive and the touch detection may be performed on the touch electrodes with touch electrodes in the same row or column being electronically connected to only one lead. For example, for the touch electrode array of M rows and N columns, M*N leads has to be disposed in the conventional art, and only M+N leads has to be disposed in the disclosure. Thereby greatly decreasing the number of the touch leads, and the problems of high complexity in design and manufacture of the touch display device, low defect-free rate and low stability of the touch display device are solved. And ghost points are eliminated, hence the touch scanning efficiency is increased by the control circuit performing the touch detecting on the touch electrodes.

It is also provided according to an embodiment of the disclosure a touch display panel including the array substrate according to any one of the above embodiments. The touch display panel further includes an opposed substrate, where the opposed substrate includes a black matrix. In a direction perpendicular to the array substrate, projection of the black matrix is between the pixel units and covers the control circuit, to prevent the control circuit from affecting transmittance of the display device.

It is also provided according to an embodiment of the disclosure a touch display device including the touch display panel according to the above embodiment.

According to the touch display panel and the touch display device provided by the disclosure, the number of the touch leads is greatly decreased, and the problems of high complexity in design and manufacture of the touch display device, low defect-free rate and low stability of the touch display device are solved. And ghost points are eliminated, hence the touch scanning efficiency is increased by the control circuit performing the touch detecting on the touch electrodes.

Figure 7:
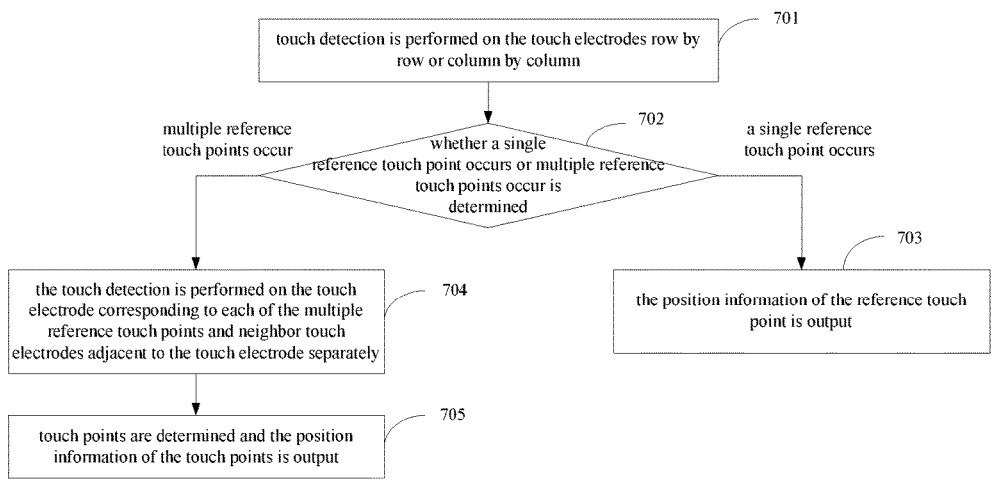
FIG. 7 is a flowchart of a detection method according to an embodiment of the disclosure.

It is provided according to an embodiment of the disclosure a detection method applied to the array substrate according to any one of above embodiments. FIG. 7 is a flowchart of the detection method. The detection method includes step S701 to step S705.

In step S701, touch detection is performed on the touch electrodes row by row or column by column.

The process of performing the touch detection on the touch electrodes row by row or column by column includes: a first control signal and a touch detection signal are input to the first leads one by one and a second control signal is input to the second leads one by one, to perform the touch detection on the touch electrodes row by row through the first leads; or the first control signal and the touch detection signal are input to the second leads one by one and the second control signal is input to the first leads one by one, to perform the touch detection on the touch electrodes column by column through the second leads.

In S702, whether a single reference touch point occurs or multiple reference touch points occur is determined. The process proceeds to step S703 in the case that a single reference touch point occurs, and the process proceeds to step S704 in the case that multiple reference touch points occur.

For example, in the case of two points are touched, there are two abscissa points and two ordinate points, i.e. four coordinate points. In fact, only two points are touched, other two points other than the touched points are ghost points. When the touch detection is performed, a detection result has to output after the ghost points are eliminated. In the case of a single point is touched, there are one abscissa point and one ordinate point, i.e. one coordinate point. No ghost point exists, and the position information of the touch point is output.

In step S703, position information of the reference touch point is output.

In step S704, the touch detection is performed on the touch electrode corresponding to the reference touch point and a neighbor touch electrode adjacent to the touch electrode separately.

In step S705, the touch points are determined and position information of the touch points is output.

In the case that a ghost point occur, the touch detection has to be performed on the touch electrode corresponding to each of the plurality of reference touch points and a neighbor touch electrode adjacent to the touch electrode separately, to eliminate the ghost points and determine the touch points, then the position information of the touch points is output.

The process of performing touch detection on the touch electrode corresponding to each of the plurality of reference touch points includes: the first control signal and the touch detection signal are input to the first lead corresponding to the touch electrode and the second control signal is input to the second lead corresponding to the touch electrode, to perform the touch detection on the touch electrode separately; or the second control signal is input to the first lead corresponding to the touch electrode and the first control signal and the touch detection signal are input to the second lead corresponding to the touch electrode, to perform the touch detection on the touch electrode separately.

Figure 8:
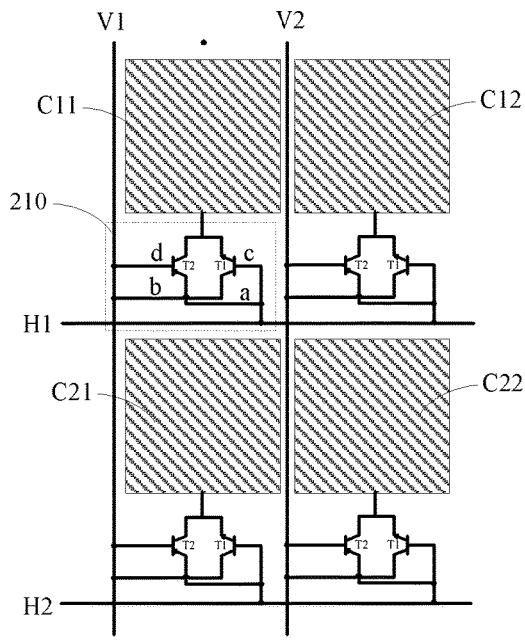
FIG. 8 is a schematic structural diagram of an array substrate according to another embodiment of the disclosure.

The process of performing the touch detection on the touch electrodes row by row or column by column or separately is described in the embodiment by taking the array substrate shown in FIG. 8 as an example. As shown in FIG. 8, the array substrate includes the touch electrodes C11, C12, C21 and C22. The first control terminals c and the first input terminals a of the control circuits 210 corresponding to the touch electrodes C11 and C12 are electronically connected to the first lead H1, and the first control terminals c and the first input terminals a of the control circuits 210 corresponding to the touch electrodes C21 and C22 are electronically connected to the first lead H2. The second control terminals d and the second input terminals b of the control circuits 210 corresponding to the touch electrodes C11 and C12 are electronically connected to the second lead V1, and the second control terminals d and the second input terminals b of the control circuits 210 corresponding to the touch electrodes C12 and C22 are electronically connected to the second lead V2.

second lead V1 corresponding to the touch electrode C11, to perform the touch detection on the touch electrode C11 separately; or the second control signal H is input to the first lead H1 corresponding to the touch electrode C11 and the first control signal L and the touch detection signal S are input to the second lead V1 corresponding to the touch electrode C11, to perform the touch detection on the touch electrode C11 separately.

In other embodiments of the disclosure, before performing the touch detection on the touch electrodes row by row or column by column, the detection method further includes: the first control signal L and the touch drive signal S1 are input to the first leads H1 and H2 one by one and the second control signal H is input to the second leads V1 and V2 one by one, to perform touch drive on the touch electrodes row by row through the first leads; or the first control signal L and the touch drive signal Si are input to the second leads V1 and V2 one by one and the second control signal H is input to the first leads H1 and H2 one by one, to perform touch drive on the touch electrodes column by column through the second leads.

Alternatively, before performing touch detection on the touch electrode corresponding to each of the plurality of reference touch points, the detection method further includes:

the first control signal L and the touch drive signal S1 are input to the first lead H1 corresponding to the touch elec-

TABLE 1

| V1 | V2 | H1 | H2 | STATE |
|---|---|---|---|---|
| L + S1/S | H | H | H | the touch drive or the touch detection on the first column of the touch electrodes is performed through V1 |
| H | L + S1/S | H | H | the touch drive or the touch detection on the second column of the touch electrodes is performed through V2 |
| H | H | L + S1/S | H | the touch drive or the touch detection on the first row of the touch electrodes is performed through H1 |
| H | H | H | L + S1/S | the touch drive or the touch detection on the second row of the touch electrodes is performed through H2 |
| L + S1/S | H | H | L | the touch drive or the touch detection on the touch electrode C11 is performed through V1 |
| L + S1/S | H | L | H | the touch drive or the touch detection on the touch electrode C21 is performed through V1 |

As shown in Table 1, the process of performing the touch detection on the touch electrodes row by row or column by column includes:

the first control signal L and the touch detection signal S are input to the first leads H1 and H2 one by one and the second control signal H is input to the second leads V1 and V2 one by one, to perform the touch detection on the touch electrodes row by row through the first leads; or the first control signal L and the touch detection signal S are input to the second leads V1 and V2 one by one and the second control signal H is input to the first leads H1 and H2 one by one, to perform the touch detection on the touch electrodes column by column through the second leads.

The process of performing touch detection on the touch electrode corresponding to each of the plurality of reference touch points includes:

the first control signal L and the touch detection signal S are input to the first lead H1 corresponding to the touch electrode C11 and the second control signal H is input to the trode C11 and the second control signal H is input to the second lead V1 corresponding to the touch electrode C11, to perform the touch drive on the touch electrode C11 separately; or the second control signal H is input to the first lead H1 corresponding to the touch electrode C11 and the first control signal L and the touch drive signal S1 are input to the second lead V1 corresponding to the touch electrode C11, to perform the touch drive on the touch electrode C11 separately.

In this embodiment, the touch drive signal S1 and the touch detection signal S may be input via the first input terminal a. Alternatively, the touch drive signal 51 may be input via the first input terminal a and the touch detection signal S may be input via the second input terminal b. Alternatively, the touch drive signal 51 may be input via the second input terminal b and the touch detection signal S may be input via the first input terminal a. Alternatively, the touch drive signal 51 and the touch detection signal S may be input via the second input terminal b, which is not limited herein.

The voltage of the first control signal is lower than the voltage of the second control signal, in the case that the control circuit includes the first transistor and the second transistor and the first transistor and the second transistor are NMOS transistors; the voltage of the first control signal is higher than the voltage of the second control signal, in the case that the control circuit includes the first transistor and the second transistor and the first transistor and the second transistor are PMOS transistors.

According to the touch detection method provided by the embodiment, the touch detection is performed on the touch electrodes row by row or column by column through the first leads, the second leads and the control circuit, whether a single reference touch point occurs or multiple reference touch points occur is determined, and position information of the reference touch point is output in the case that a single reference touch point occurs, or the touch detection on is performed on the touch electrode corresponding to each of the plurality of reference touch points and neighbor touch electrodes adjacent to the touch electrode separately to determine touch points and output the position information of the touch points, in the case that multiple reference touch points occur. In this way, the ghost points are eliminated, hence the touch scanning efficiency is increased.

The embodiments of the disclosure are described herein in a progressive manner, with an emphasis placed on explaining the difference between each embodiment and the other embodiments; hence, for the same or similar parts among the embodiments, they can be referred to from one another. For the device disclosed in the embodiments, the corresponding descriptions are relatively simple because the device and system correspond to the methods disclosed in the embodiments. The relevant portions may be referred to the description for the method parts.

The above description of the embodiments disclosed herein enables those skilled in the art to implement or use the disclosure. Numerous modifications to the embodiments will be apparent to those skilled in the art, and the general principle herein can be implemented in other embodiments without deviation from the spirit or scope of the disclosure. Therefore, the disclosure will not be limited to the embodiments described herein, but in accordance with the widest scope consistent with the principle and novel features disclosed herein.

The invention claimed is:

1. An array substrate, comprising:
a common electrode layer divided into a plurality of touch electrodes disposed as an array; and
a plurality of control circuits each is respectively connected to a corresponding one of the plurality of touch electrodes, wherein each of the plurality of control circuits comprises:
a first input terminal via which a touch drive signal or a touch detection signal is a first input;
a second input terminal via which the touch drive signal or the touch detection signal is a second input;
a first control terminal controlling transmission of the second input received at the second input terminal; and
a second control terminal controlling transmission of the first input received at the first input terminal;
a plurality of first leads, each electronically connected to the first control terminals and the first input terminals of the control circuits corresponding to the plurality of touch electrodes in a same row of the array; and
a plurality of second leads, each electronically connected to the second control terminals and the second input terminals of the control circuits corresponding to the plurality of touch electrodes in a same column of the array;
wherein the plurality of control circuits each comprises a first transistor and a second transistor, a second electrode of the first transistor and a second electrode of the second transistor are electronically connected to the touch electrode corresponding to the control circuit, wherein a gate electrode of the first transistor is the first control terminal of said control circuit, a first electrode of the second transistor is the first input terminal of said control circuit, a gate electrode of the second transistor is the second control terminal of said control circuit, and a first electrode of the first transistor is the second input terminal of said control circuit.

2. The array substrate according to claim 1, wherein the first transistor and the second transistor are NMOS transistors or PMOS transistors.

3. The array substrate according to claim 2, wherein the plurality of touch electrodes each comprises a plurality of touch sub-electrodes, wherein a plurality of sub-control circuits each has a one to one correspondence to the plurality of touch sub-electrodes, and wherein the plurality of sub-control circuits are connected in parallel.

4. The array substrate according to claim 3, wherein the array substrate further comprises a plurality of gate lines, a plurality of data lines and a plurality of pixel units defined by the plurality of gate lines and the plurality of data lines, wherein an extending direction of the plurality of first leads is parallel to an extending direction of the plurality of gate lines, and an extending direction of the plurality of second leads is parallel to an extending direction of the plurality of data lines.

5. The array substrate according to claim 1,
wherein the plurality of control circuits each provides input of the touch drive signal or the touch detection signal via either the first or the second input terminal.

6. A touch display panel comprising an array substrate, wherein the array substrate comprises:
a common electrode layer divided into a plurality of touch electrodes disposed as an array; and
a plurality of control circuits wherein each control circuit is respectively connected to a corresponding one of the plurality of touch electrodes, wherein each of the plurality of control circuits comprises:
a first input terminal via which a touch drive signal or a touch detection signal is a first input;
a second input terminal via which the touch drive signal or the touch detection signal is a second input;
a first control terminal controls transmission of the second input received at the second input terminal; and
a second control terminal controls transmission of the first input received at the first input terminal;
a plurality of first leads, each electronically connected to the first control terminals and the first input terminals of the control circuits corresponding to the plurality of touch electrodes in a same row of the array; and
a plurality of second leads, each electronically connected to the second control terminals and the second input terminals of the control circuits corresponding to the plurality of touch electrodes in a same column of the array;
wherein the plurality of control circuits each comprises a first transistor and a second transistor, a second electrode of the first transistor and a second electrode of the second transistor are electronically connected to the touch electrode corresponding to the control circuit, wherein a gate electrode of the first transistor is the first control terminal of said control circuit, a first electrode of the second transistor is the first input terminal of said control circuit, a gate electrode of the second transistor is the second control terminal of said control circuit, and a first electrode of the first transistor is the second input terminal of said control circuit.

7. The touch display panel according to claim 6, further comprising an opposed substrate, wherein the opposed substrate comprises a black matrix, and projection of the black matrix covers the control circuit in a direction perpendicular to the array substrate.

8. A detection method applied to an array substrate, wherein the array substrate comprises:
   a common electrode layer divided into a plurality of touch electrodes disposed as an array; and
   a plurality of control circuits wherein each control circuit is respectively connected to a corresponding one of the plurality of touch electrodes, wherein each of the plurality of control circuits comprises:
      a first input terminal via which a touch drive signal or a touch detection signal is a first input;
      a second input terminal via which the touch drive signal or the touch detection signal is a second input;
      a first control terminal controls transmission of the second input received at the second input terminal; and
      a second control terminal controls transmission of the first input received at the first input terminal;
   a plurality of first leads, each electronically connected to the first control terminals and the first input terminals of the control circuits corresponding to the plurality of touch electrodes in a same row of the array; and
   a plurality of second leads, each electronically connected to the second control terminals and the second input terminals of the control circuits corresponding to the plurality of touch electrodes in a same column of the array;
   wherein the plurality of control circuits each comprises a first transistor and a second transistor, a second electrode of the first transistor and a second electrode of the second transistor are electronically connected to the touch electrode corresponding to the control circuit, wherein a gate electrode of the first transistor is the first control terminal of said control circuit, a first electrode of the second transistor is the first input terminal of said control circuit, a gate electrode of the second transistor is the second control terminal of said control circuit, and a first electrode of the first transistor is the second input terminal of said control circuit,
   wherein the detection method comprises:
   performing touch detection on the touch electrodes row by row or column by column;
   determining whether a single reference touch point occurs or a plurality of reference touch points occur; and
   outputting position information of the reference touch point in that one reference touch point occurs; or
   performing separate touch detection on the touch electrode corresponding to one of the plurality of reference touch points and neighbor touch electrodes adjacent to said touch electrode to determine touch points and outputting position information of the touch points, in case that the plurality of reference touch points occur.

9. The detection method according to claim 8, before performing the touch detection on the touch electrodes row by row, wherein the detection method further comprises:
   inputting a first control signal and the touch drive signal to the first leads one by one and inputting a second control signal to the second leads one by one, to perform touch drive on the touch electrodes row by row through the first lead.

10. The detection method according to claim 9, wherein performing the touch detection on the touch electrodes row by row comprises:
   inputting the first control signal and the touch detection signal to the first leads one by one and inputting the second control signal to the second leads one by one, to perform the touch detection on the touch electrodes row by row through the first lead.

11. The detection method according to claim 10, wherein performing touch detection on the touch electrode corresponding to one of the plurality of reference touch points separately comprises:
   inputting the first control signal and the touch detection signal to the first lead corresponding to the touch electrode and inputting the second control signal to the second lead corresponding to the touch electrode, to perform the touch detection on the touch electrode separately.

12. The detection method according to claim 8, before performing the touch detection on the touch electrodes column by column, wherein the detection method further comprises:
   inputting a first control signal and the touch drive signal to the second leads one by one and inputting a second control signal to the first leads one by one, to perform touch drive on the touch electrodes column by column through the second leads.

13. The detection method according to claim 12, wherein performing the touch detection on the touch electrodes column by column comprises:
   inputting the first control signal and the touch detection signal to the second leads one by one and inputting the second control signal to the first leads one by one, to perform the touch detection on the touch electrodes column by column through the second leads.

14. The detection method according to claim 13, wherein performing touch detection on the touch electrode corresponding to one of the plurality of reference touch points separately comprises:
   inputting the second control signal to the first lead corresponding to the touch electrode and inputting the first control signal and the touch detection signal to the second lead corresponding to the touch electrode, to perform the touch detection on the touch electrode separately.

15. The detection method according to claim 8, wherein a voltage of the first control signal is lower than a voltage of the second control signal, in the case that the control circuit comprises the first transistor and the second transistor and the first transistor and the second transistor are NMOS transistors; or a voltage of the first control signal is higher than a voltage of the second control signal, in the case that the control circuit comprises the first transistor and the second transistor and the first transistor and the second transistor are PMOS transistors.

* * * * *